ись
United States Patent
Leijten et al.

(10) Patent No.: US 7,032,102 B2
(45) Date of Patent: Apr. 18, 2006

(54) SIGNAL PROCESSING DEVICE AND METHOD FOR SUPPLYING A SIGNAL PROCESSING RESULT TO A PLURALITY OF REGISTERS

(75) Inventors: Jeroen Anton Johan Leijten, Eindhoven (NL); Marco Jan Gerrit Bekooij, Eindhoven (NL); Adrianus Josephus Bink, Chicago, IL (US); Johan Sebastiaan Henri Van Gageldonk, Eindhoven (NL); Jan Hoogerbrugge, Eindhoven (NL); Bart Mesman, Eindhoven (NL); Cornelis Arnoldus Josephus Van Eijk, Hilvarenbeek (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 451 days.

(21) Appl. No.: 10/016,184

(22) Filed: Dec. 10, 2001

(65) Prior Publication Data

US 2002/0091911 A1    Jul. 11, 2002

(30) Foreign Application Priority Data

Dec. 11, 2000   (EP)   .................................. 00204430

(51) Int. Cl.
G06F 9/44    (2006.01)
G06F 9/50    (2006.01)

(52) U.S. Cl. .................. 712/225; 712/24; 712/229

(58) Field of Classification Search .................. 712/24, 712/225, 229
See application file for complete search history.

(56) References Cited

U.S. PATENT DOCUMENTS 4,975,836 A * 12/1990 Hirosawa et al. ........... 718/100
5,530,817 A *  6/1996 Masubuchi .................. 712/24
5,537,606 A *  7/1996 Byrne .......................... 712/7
6,205,543 B1 *  3/2001 Tremblay et al. ........... 712/228

FOREIGN PATENT DOCUMENTS

WO    WO0033178          12/1999
WO    WO 00/33178 A  *  8/2000

OTHER PUBLICATIONS

The Authoritative Dictionary of IEEE Standards Terms, 2000, IEEE Press, 7th Edition, p. 949.*

* cited by examiner

Primary Examiner—Daniel H Pan

(57) ABSTRACT

A signal processing device and method of supplying a signal processing result to a plurality of registers arranged in different register files. A plurality of different register files are selected based on a corresponding indication in said instruction word and the register address is supplied to said selected register files. Result values can be broadcasted to multiple registers in a single processor cycle while a copy operation between different register files is eliminated. Broadcasting is thus implemented via overlapping register address spaces, since physical registers having the same logical register address are provided in different register files.

10 Claims, 4 Drawing Sheets

Figure 1:
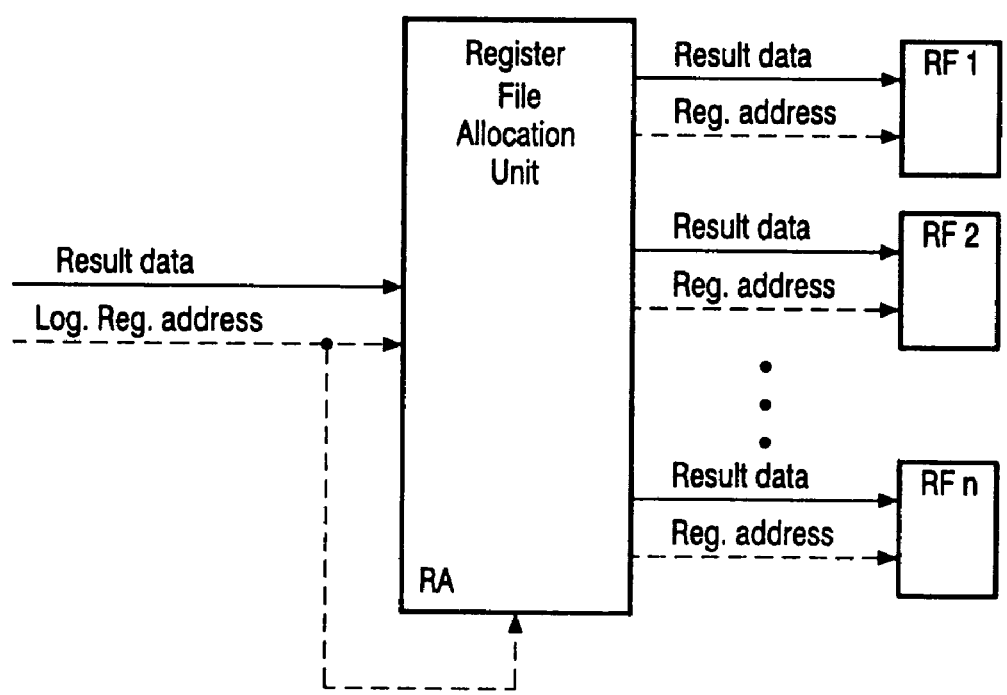

SIGNAL PROCESSING DEVICE AND METHOD FOR SUPPLYING A SIGNAL PROCESSING RESULT TO A PLURALITY OF REGISTERS

The present invention relates to a signal processing device, such as a digital signal processor with a large instruction word using data stationary instruction encoding, as defined in the preamble of claim 1. Furthermore, the present invention relates to a method of supplying a signal processing result to a plurality of registers as defined in the preamble of claim 8.

Mobile radio and internet applications have significantly spread in recent years. Digital signal processors (DSPs) have been optimized for mobile stations and modems. Meanwhile increased attention has been directed to infrastructural devices such as base stations, switching centers, modem servers for internet service providers, and remote access servers, to mention only a few components of the communication network. To cope with the increased subscriber density, new DSPs have to be developed, which are capable of managing an increased number of connections within the network to thereby provide sufficient processing resources for third generation mobile telecommunication applications (UMTS) and demanding audio applications (e.g. compressed audio).

In the development of high performance DSPs, focus has been directed to an increase of the processing power. This may be achieved either by providing higher processor clock rates or by adding further functional units (i.e. parallelization). The latter approach is based on parallel processing of a plurality of partial tasks within a program section, and can be achieved by using a so-called "Very Long Instruction Word" (VLIW). This VLIW concept can be achieved by integrating several functional units on the same chip to thereby achieve a powerful processing machine which is controlled by a very long instruction word. Such a parallel instruction word includes individual instructions to the individual processing units. The challenge of such an approach is to split an algorithm into partial tasks which can be performed in parallel on this architecture. These partial tasks are distributed to the individual functional units under strict consideration of the process timing to thereby achieve a constant duty rate of each unit. This object is achieved by the so-called scheduling which may be performed by an intelligent compiler.

The results obtained from the processing of the functional units may be stored in respective register files allocated to the functional units and comprising a plurality of physical registers which can be addressed by a logical address, e.g. a result register index.

Various known processors use different physical registers with the same logical register addresses in different physical register files. These are used to ease implementation of a VLIW processor with a single logical register file. In effect, this means that every variable is written to one register in each physical register file. Thereby, a broadcasting function can be achieved in hardware in order to deal with timing problems of a single multiport register file.

In other processor types, partitioned register files and broadcasting have been suggested. In this case, the implementation of the broadcasting function is cheap, since the architecture is based on a time stationary paradigm, which allows a data path in which different register file write ports can select either different or equal result busses to retrieve results. However, such a function is not possible in a data stationary instruction encoding, which requires complex hardware to buffer data path control information supplied by the processor sequencer.

Clustered VLIW processors make use of multiple register files to store variables. These register files are logically visible to the compiler and/or assembly language programmer. Often, a functional unit can read its operands or write its result only to a subset of these register files. Thus, a variable required by a specific functional unit may be located in a register file which is not directly accessible by this specific functional unit. In such a case, a copy of the variable has to be written to an accessible register file. To reduce the overhead generated by such copy operations, a broadcasting technique has been implemented in some processors to write a result from a specific functional unit in the same cycle to multiple register files. Such a broadcasting function may easily be implemented as long as the processor data path is organized in such a manner, that a register file write port can select one of multiple result busses, to which functional unit output ports are attached, for a reading operation. However, in a data stationary processor, such a data path organization is costly due to the buffer requirements already mentioned above. Instead, an output port of the functional unit has to select one of multiple result busses, to which the register file write ports are attached, for performing a writing operation. Thus, the provision of a broadcasting function leads to an undesirable increase in the costs of the processor.

It is therefore an object of the present invention to provide a signal processing device and a broadcasting method by means of which implementation costs can be kept low.

This object is achieved by a signal processing device as defined in claim 1. Furthermore, this object is achieved by a method of supplying a signal processing result to a plurality of registers, as defined in claim 8.

Accordingly, a cheap form of broadcasting can be implemented by using a few physical registers with the same logical register address in different register files. In this way, register files are arranged where the logical register address range of a part of the file overlaps with that of other files. Due to the fact that the register allocation means selects at least two register files and supplies the register address to the selected register files, copy operations between register files can be eliminated. The results of the functional units can be broadcasted to multiple registers of different register files in a single processor cycle. In fact, broadcasting is implemented by overlapping register address spaces.

According to an advantageous development, the functional units may be arranged to supply the corresponding indication to the register allocation means. Thus, the register allocation means performs a switching function to predetermined register files in response to the received indication.

The corresponding indication may be an information stating that the result is to be written to the register address of said selected register files, or may be a result register address which refers to a multicast or broadcast register in the selected register files. Thereby, the instruction word may either comprise a corresponding control or flag information indicating the broadcasting or multicasting function, or may include a specific result register address indicating multicast or broadcast registers in the selected register files.

According to another advantageous development, the register allocation means may comprise a demultiplexing means for demultiplexing the result and the register address to the selected register files in response to the corresponding indication. In this case, a cheap implementation of the broadcasting function can be achieved simply by adding respective demultiplexers at the outputs of the functional units.

The signal processing device may be any type of VLIW processor with partitioned register files using data stationary instruction encoding. Furthermore, the functional units may be functional unit clusters comprising a plurality or functional units to which a register file is allocated.

Figure 2:
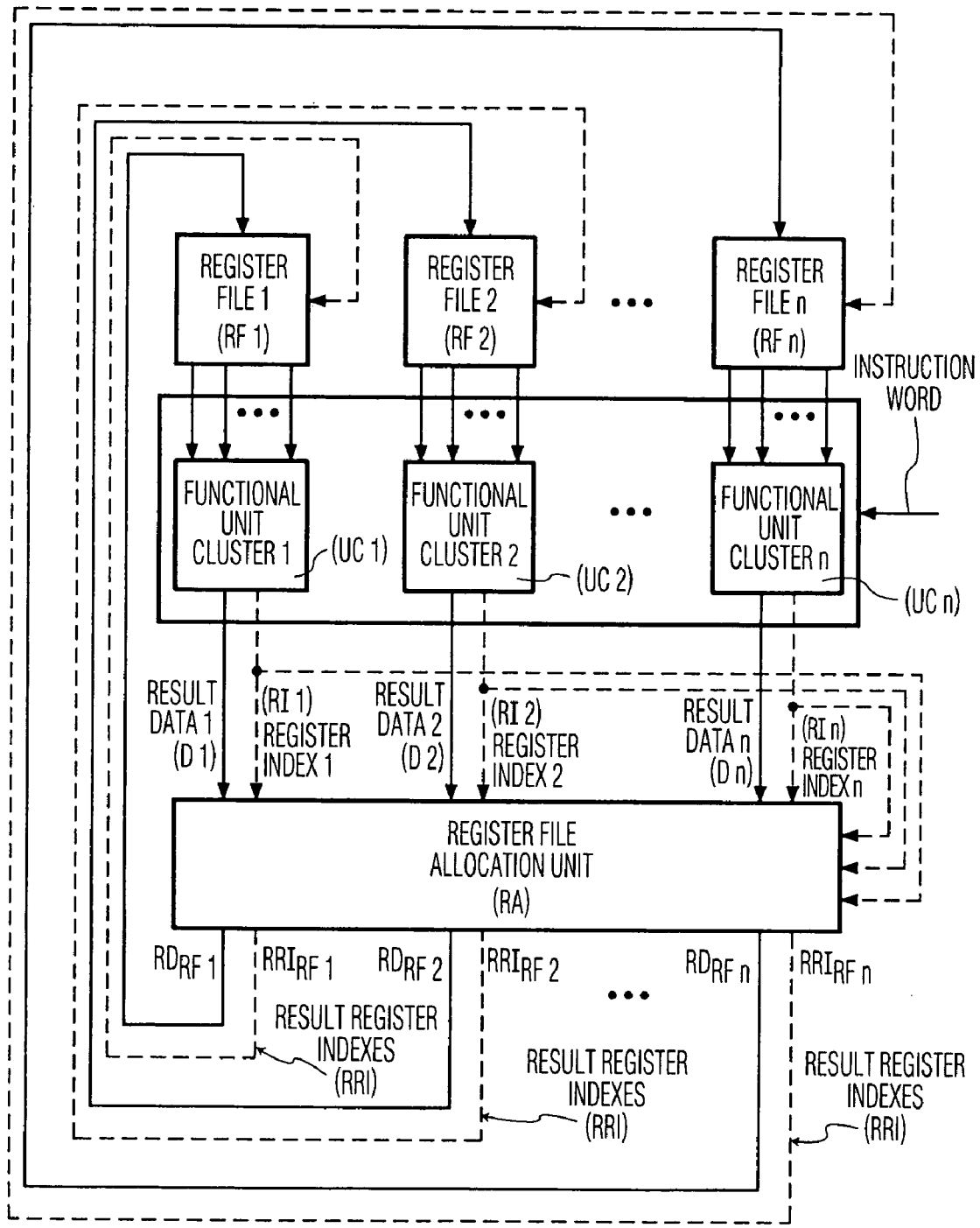
Figure 3:
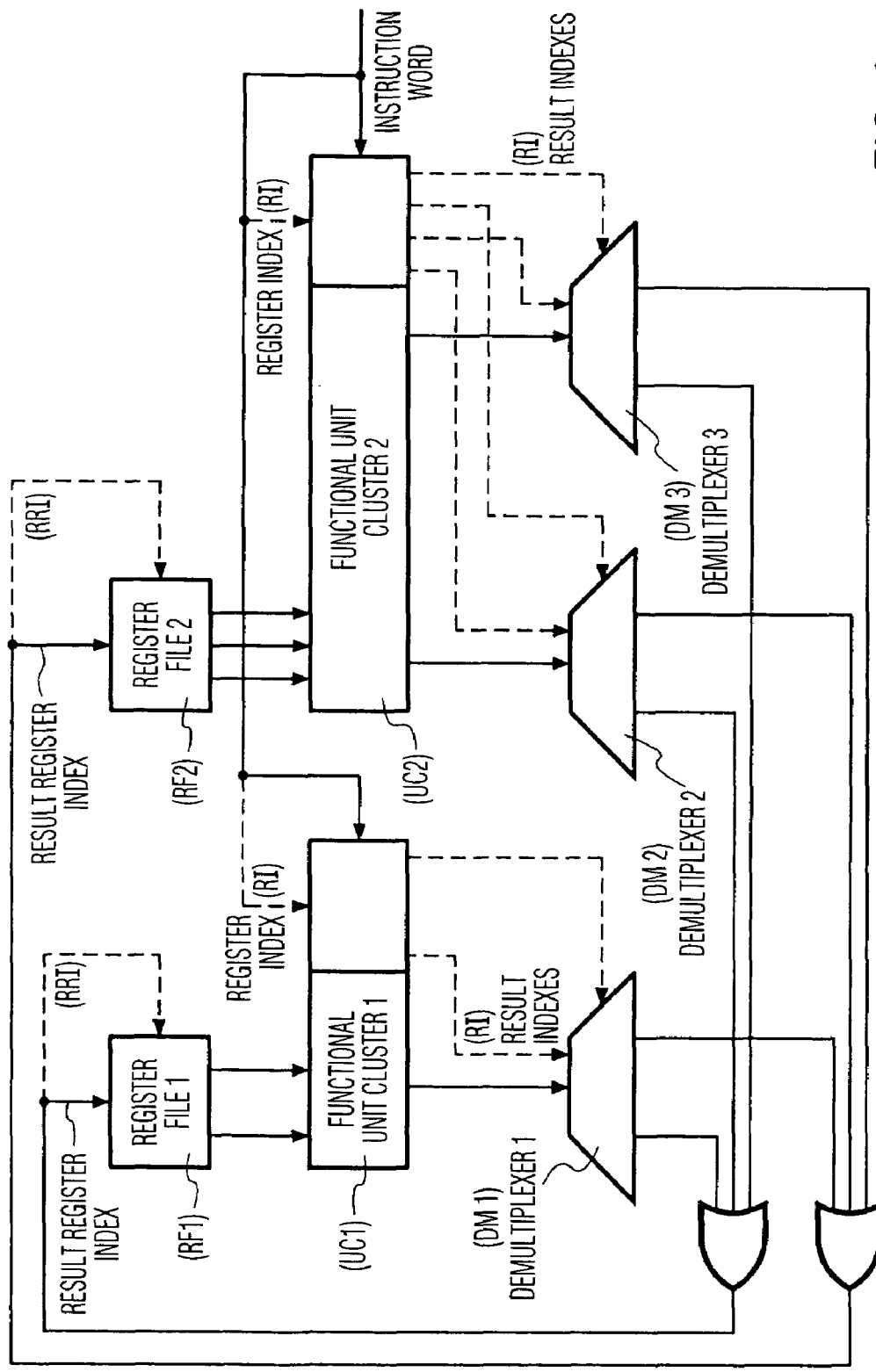
Figure 4:
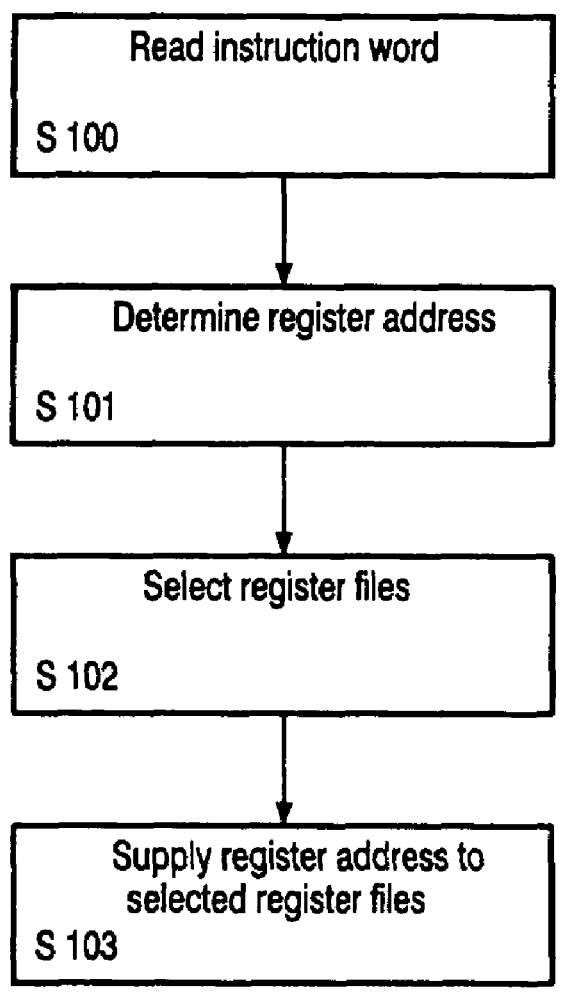

In the following, a preferred embodiment of the present invention is described with reference to the accompanying drawings of which:

FIG. 1 shows a basic block diagram of the broadcasting principle underlying the preferred embodiment of the present invention, FIG. 2 shows a basic block diagram of a general implementation of a signal processing device according to the preferred embodiment of the present invention, FIG. 3 shows a specific implementation of the preferred embodiment comprising two functional unit clusters and two register files, and FIG. 4 shows a basic flow diagram of the broadcasting method according to the preferred embodiment of the present invention.

The preferred embodiment will now be described on the basis of a data path of a data stationary VLIW processor with partitioned register files using a data stationary instruction encoding.

FIG. 1 shows a basic block diagram of the broadcasting principle underlying the preferred embodiment of the present invention. According to FIG. 1, a logical register address derived from an instruction word of the respective functional unit, and the result data obtained from the functional unit are supplied to a register file allocation unit RA which is arranged to supply the result data and the logical register address or a register address derived from the logical register address to a specific one or a plurality of specific ones of register files RF1 to RFn. The selecting or switching operation of the register file allocation unit RA is performed in response to the logical register address or a control information derived from the logical register address or the corresponding instruction word. Thus, the register file allocation unit RA may be implemented by a demultiplexer, a controllable switching function or any logical circuit, so as to achieve the desired distribution of the result data and logical register address.

FIG. 2 shows a principle block diagram of the general components required for achieving the broadcasting or multicasting function according to the present invention in a general case of n register files RF1 to RFn and n functional unit clusters UC1 to UCn. According to FIG. 2, an instruction word having a width i and including a result index RI is supplied to the functional unit clusters UC1 to UCn. As already mentioned, the instruction word comprises respective instructions for partial tasks performed in parallel by respective ones of the functional unit clusters UC1 to UCn based on respective variables obtained from the register files RF1 to RFn. The result data D1 to Dn obtained from the functional unit clusters UC1 to UCn are supplied to a register file allocation unit RA together with respective result indices RI1 to RIn derived from the result index RI included in or derived from the instruction word. The register file allocation unit is arranged to supply the input values D1 to Dn and RI1 to RIn as respective output values $RD_{RF1}$ to $RD_{RFn}$ and $RRI_{RF1}$ to $RRI_{RFn}$ to the respective partitioned register files RF1 to RFn. The selection or switching function of the register file allocation unit LA is performed in response to the register indices RI1 to RIn supplied as a control information to the register file allocation unit RA.

Therefore, any of the result data D1 to Dn and register indices RI1 to RIn can be distributed to any or several ones of the partitioned register files RF1 to RFn to thereby achieve a broadcasting or multicasting function. It is noted that the signal processing device shown in FIG. 2 may be arranged such that the functional unit clusters UC1 to UCn may access any of the register files RF1 to RFn.

FIG. 3 shows an implementation of the preferred embodiment for two functional unit clusters UC1 and UC2 with two partitioned register files RF1 and RF2, wherein the register file allocation function is achieved by three demultiplexers DM1 to DM3. According to FIG. 3, the broadcasting of variable to the register files RF1 and RF2 is achieved simply by using demultiplexers at the outputs of the functional unit clusters UC1 and UC2, which can transfer a result to multiple ones of their outputs. In the instruction word, a single result register address (result index) is specified for a variable. If in the global logical register address map, the address refers to a multicast or broadcast register in different register files, the corresponding multiple outputs of the respective demultiplexer are connected to the result busses of these registers via corresponding logical OR-gates. The result busses will then carry the variable to its exact destinations. Together with the variable or result data, a result register index RRI is supplied via the result busses to the respective register files RF1 and/or RF2, where it is used for addressing the desired physical register to which the result data shall be written.

In the case shown in FIG. 3, the first functional unit cluster UC1 is arranged to receive two variables from the first register file RF1 and to supply one result to the first demultiplexer DM1. The second functional unit cluster UC2 is arranged to receive three variables from the second register file RF2 and to output two results to respective demultiplexers DM2 and DM3. The functional units each comprise a register portion in which the result index RI is processed and supplied to the input and controlled terminal of the respective one of the demultiplexers DM1 to DM3 so as to achieve the demultiplexing function. It is noted that the result index RI may be identical with the result register index RRI. Alternatively, the result index RI may differ from the result register index RRI by an additional information indicating the broadcasting function and the desired register file.

FIG. 4 shows a basic flow diagram of the broadcasting or multicasting function performed in the preferred embodiment of the present invention. In step S100, the instruction word supplied to the respective functional unit cluster is read. Then, the register address or result index is determined or derived from the instruction word in step S101. Based on the determined result index RI, physical register files RF1 to RFn are selected by the register file allocation function (step S102). Finally, the result data and the register address RRI indicating the selected physical register are supplied to the selected physical register files (step S103). Thereby, the result data are available in several physical registers of different ones of the register files RF1 to RFn, such that the results are immediately available to each of the functional unit clusters UC1 to UCn.

It is noted that the invention can be used in any type of VLIW processor with partitioned register files using data stationary instruction encoding.

According to the present invention, a cheap form of broadcasting can be implemented by using a few physical registers with the same logical register address in different register files RF1 to RFn. In this way, register files with overlapping address ranges can be achieved. If a register address refers to physical registers in all register files, broadcasting can be implemented simply by stating in the instruction that result must be written to this register address. The hardware (e.g. register file allocation unit RA) will then ensure that the result is written to all physical locations carrying that same address. Alternatively, it is possible to have a register address only refer to physical registers in a subset of all register files RF1 to RFn. In this way, multicasting can be implemented.

While the invention has been described in conjunction with the preferred embodiment, it will evident to those skilled in the art that many further alternatives, modifications and variations will be apparent in the light of the foregoing description. Thus, the invention described herein is intended to embrace all such alternatives, modifications, applications and variations within the scope of the appended claims.

The invention claimed is:

1. A signal processing device comprising a plurality of functional units (UC1–UCn) for processing digital data based on an instruction word, a plurality of register files (RF1–RFn) for storing results obtained from said functional units, wherein said functional units are arranged to write a result to a predetermined register of said register files by using a register address (RRI) derived from said instruction word, and register allocation means (RA) for selecting at least two of said register files (RF1–RFn) and for supplying said register address to said selected register files, based on a corresponding indication in said instruction word, wherein said indication providing information for selecting which of said at least two register files.

2. The device according to claim 1, wherein said functional units (UC1–UCn) are arranged to supply said corresponding indication to said register allocation means (RA).

3. The device according to claim 1, wherein said signal processing device is a programmable VLIW processor, and said register files are partitioned register files (RF1–RFn), wherein a data stationary instruction encoding is used.

4. The device according to claim 1, wherein said corresponding indication is an information stating that said result is to be written to said register address of said selected register files.

5. The device according to claim 1, wherein said corresponding indication is a result index (RI) which refers to a multicast or broadcast register in said selected register files.

6. The device according to claim 1, wherein said register allocation means comprises demultiplexing means (DM1–DM3) for demultiplexing said result and said register address (RRI) to said selected register files in response to said corresponding indication.

7. The device according to claim 1, wherein said functional units are functional unit clusters (UC1–UCn).

8. A method of supplying a signal processing result to a plurality of registers arranged in different register files (RA1–RAn) of a signal processing device, said method comprising the steps of:

a) determining a register address (RRI) based on an instruction word, b) supplying said register address to said plurality of register files, and, c) selecting at least two of said plurality of register files based on a corresponding indication in said instruction word, wherein said indication providing information for selecting which of said at least two register files, and supplying said register address to said selected register files.

9. The method according to claim 8, wherein said corresponding indication is an information stating that said result is to be written to said register address of said selected register files.

10. The method according to claim 8, wherein said corresponding indication is a result index (RI) which refers to a multicast or broadcast register in said selected register files.

* * * * *